US012710328B2

(12) United States Patent
Singh et al.

(10) Patent No.: US 12,710,328 B2
(45) Date of Patent: Aug. 18, 2026

(54) LOAD ESTIMATION SYSTEM FOR A TIRE

(71) Applicant: The Goodyear Tire & Rubber Company, Akron, OH (US)

(72) Inventors: Kanwar Bharat Singh, Bofferdange (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 485 days.

(21) Appl. No.: 17/818,837

(22) Filed: Aug. 10, 2022

(65) Prior Publication Data

US 2023/0060281 A1 Mar. 2, 2023

Related U.S. Application Data

(60) Provisional application No. 63/238,266, filed on Aug. 30, 2021.

(51) Int. Cl.
*G01L 17/00* (2006.01)
*B60C 11/24* (2006.01)
(Continued)

(52) U.S. Cl.
CPC .......... *G01L 17/005* (2013.01); *B60C 11/246* (2013.01); *B60C 23/064* (2013.01); *G01G 19/10* (2013.01); *G01M 17/02* (2013.01)

(58) Field of Classification Search
CPC ... G01L 17/005; B60C 11/246; B60C 23/064; B60C 2019/004; B60C 23/04; G01G 19/10; G01M 17/02
See application file for complete search history.

(56) References Cited

U.S. PATENT DOCUMENTS 3,661,014 A 5/1972 Ciampolini
4,364,267 A 12/1982 Love, Jr. et al.
(Continued)

FOREIGN PATENT DOCUMENTS

CN 106626994 A 5/2017
CN 111976398 A 11/2020
(Continued)

OTHER PUBLICATIONS

"Artificial Neural Network", Steven Walczak, Narciso Cerpa, in Encyclopedia of Physical Science and Technology (Third Edition), 2003 (Year: 2003).*
(Continued)

*Primary Examiner* — Eman A Alkafawi
*Assistant Examiner* — Dilara Sultana
(74) *Attorney, Agent, or Firm* — Edward T. Kennedy

(57) ABSTRACT

A load estimation system for a tire is provided. The tire includes a pair of sidewalls extending to a circumferential tread and supports a vehicle. A sensor is mounted to the tire and measures an inflation pressure of the tire and a footprint length of the tread. A vehicle loading state estimator determines a loading state of the vehicle. An inflation correction factor is determined from the vehicle loading state. A pressure correction module receives the measured footprint length, the measured inflation pressure, and the inflation correction factor, and determines an adjusted footprint length. A de-noising module processor receives the adjusted footprint length to generate a filtered footprint length, and a wear correction module receives the filtered footprint length and corrects for wear of the tire to generate a wear-corrected footprint length. A load determination model receives the wear-corrected footprint length and determines an estimated load on the tire.

18 Claims, 8 Drawing Sheets

(51) Int. Cl.

| | |
|---|---|
| ***B60C 23/06*** | (2006.01) |
| ***G01G 19/10*** | (2006.01) |
| ***G01M 17/02*** | (2006.01) |

(56) References Cited

U.S. PATENT DOCUMENTS

| | | | | |
|---|---|---|---|---|
| 4,724,703 | A | 2/1988 | Neugebauer et al. | |
| 6,278,361 | B1 | 8/2001 | Magiawala et al. | |
| 6,321,180 | B1 | 11/2001 | Hubbell, Jr. | |
| 6,443,199 | B1 * | 9/2002 | Scarpitti | B60C 19/001 152/209.1 |
| 6,539,295 | B1 | 3/2003 | Katzen et al. | |
| 6,959,593 | B2 | 11/2005 | Mancosu et al. | |
| 7,000,462 | B2 | 2/2006 | Hillenmayer et al. | |
| 7,363,805 | B2 | 4/2008 | Jayakumar et al. | |
| 7,404,317 | B2 | 7/2008 | Mancosu et al. | |
| 7,536,903 | B2 | 5/2009 | Schillinger et al. | |
| 7,546,764 | B2 * | 6/2009 | Morinaga | B60C 23/064 73/146 |
| 7,552,628 | B2 | 6/2009 | Mancosu | |
| 8,255,114 | B2 | 8/2012 | Fink et al. | |
| 8,584,517 | B2 | 11/2013 | Strahan | |
| 8,661,885 | B1 | 3/2014 | Singh et al. | |
| 8,742,911 | B2 | 6/2014 | Wagner et al. | |
| 8,844,346 | B1 | 9/2014 | Singh et al. | |
| 8,874,386 | B2 | 10/2014 | Brusarosco et al. | |
| 9,120,356 | B2 | 9/2015 | Patel et al. | |
| 9,157,785 | B2 | 10/2015 | Brenninger | |
| 9,222,854 | B2 | 12/2015 | Singh et al. | |
| 9,310,242 | B2 | 4/2016 | Kammann et al. | |
| 9,358,846 | B2 | 6/2016 | Singh et al. | |
| 9,874,496 | B2 | 1/2018 | Singh | |
| 10,000,100 | B2 | 6/2018 | Weston | |
| 10,150,456 | B2 | 12/2018 | Mcintyre et al. | |
| 10,245,906 | B2 | 4/2019 | Singh et al. | |
| 10,328,755 | B2 | 6/2019 | Tebano et al. | |
| 10,596,868 | B2 | 3/2020 | Mancinelli et al. | |
| 10,684,161 | B2 | 6/2020 | Masago | |
| 11,008,015 | B2 | 5/2021 | Dharamshi et al. | |
| 11,298,991 | B2 | 4/2022 | Singh et al. | |
| 2003/0058118 | A1 | 3/2003 | Wilson | |
| 2003/0149515 | A1 | 8/2003 | Hessmert et al. | |
| 2005/0072223 | A1 | 4/2005 | Fennel et al. | |
| 2005/0085987 | A1 | 4/2005 | Yokota et al. | |
| 2005/0150283 | A1 | 7/2005 | Shick | |
| 2007/0038408 | A1 * | 2/2007 | Gaunt | B60C 23/001 702/138 |
| 2007/0240501 | A1 | 10/2007 | Mancosu et al. | |
| 2008/0103659 | A1 | 5/2008 | Mancosu | |
| 2009/0055040 | A1 | 2/2009 | Nagaya | |
| 2009/0204318 | A1 * | 8/2009 | Nimmo | B60G 17/0162 701/124 |
| 2009/0299570 | A1 * | 12/2009 | Kammann | B60C 23/0459 701/36 |
| 2011/0060500 | A1 | 3/2011 | Irth et al. | |
| 2011/0199201 | A1 | 8/2011 | Brusarosco et al. | |
| 2012/0029759 | A1 | 2/2012 | Suh et al. | |
| 2013/0211621 | A1 | 8/2013 | Breuer et al. | |
| 2013/0261991 | A1 | 10/2013 | Tebano et al. | |
| 2013/0278406 | A1 | 10/2013 | Weston | |
| 2014/0005956 | A1 | 1/2014 | Patel et al. | |
| 2014/0069181 | A1 | 3/2014 | Singh et al. | |
| 2014/0257629 | A1 | 9/2014 | Singh et al. | |
| 2014/0260585 | A1 | 9/2014 | Singh | |
| 2014/0278040 | A1 | 9/2014 | Singh et al. | |
| 2015/0217607 | A1 | 8/2015 | Singh | |
| 2015/0247780 | A1 | 9/2015 | Kretschmann et al. | |
| 2016/0121668 | A1 | 5/2016 | Singh | |
| 2016/0129737 | A1 * | 5/2016 | Singh | B60W 40/13 73/146.3 |
| 2016/0153827 | A1 | 6/2016 | Ham et al. | |
| 2017/0355234 | A1 * | 12/2017 | Dharamshi | B60C 23/0408 |
| 2019/0025113 | A1 | 1/2019 | Masago | |
| 2019/0232722 | A1 * | 8/2019 | Becker | B60C 11/1353 |
| 2020/0164703 | A1 * | 5/2020 | Singh | B60W 40/13 |
| 2021/0061020 | A1 | 3/2021 | Singh et al. | |
| 2021/0086781 | A1 | 3/2021 | Steiner | |
| 2021/0300132 | A1 | 9/2021 | Sams | |
| 2021/0389191 | A1 | 12/2021 | Decoster | |

FOREIGN PATENT DOCUMENTS

| | | | | |
|---|---|---|---|---|
| DE | 102017208213 | A1 * | 11/2018 | B60C 23/002 |
| EP | 2138372 | A1 | 8/2012 | |
| EP | 2679411 | A2 | 1/2014 | |
| EP | 2777956 | A2 | 9/2014 | |
| EP | 2778631 | | 9/2014 | |
| JP | 2007153034 | A | 6/2007 | |
| JP | 2011053027 | A | 3/2011 | |
| KR | 100302061 | B1 | 5/1984 | |
| KR | 20210045571 | A * | 4/2021 | B60W 40/11 |
| WO | 2008075126 | A1 | 6/2008 | |
| WO | 2011054363 | A1 | 5/2011 | |
| WO | 2020202212 | A2 | 10/2020 | |

OTHER PUBLICATIONS

Extended search report issued in corresponding European application received by applicant on Jan. 6, 2023.

English translation of the Search Report issued Mar. 28, 2025 for CN202211047566.0.

* cited by examiner

44

Slope (mm/bar):-20.70

Shorter Footprint

Higher pressure

38 FPL (mm)

120
110
100
90
80

3.0
3.5
4.0

40 Pressure (bar)

48

Slope (mm/100kg):9

Longer Footprint

Higher load

38 FPL (mm)

100
90
80
70
60

500
600
700
800
900

46 Tire Load (kg)

LOAD ESTIMATION SYSTEM FOR A TIRE

FIELD OF THE INVENTION

The invention relates generally to tire monitoring systems. More particularly, the invention relates to systems that collect tire parameter data. The invention is directed to a system and method for estimating tire load that employs tire parameter data to indirectly estimate tire load in an accurate and reliable manner.

BACKGROUND OF THE INVENTION

The load on each tire of a vehicle plays an important role in vehicle factors such as handling, safety, reliability, and performance. Measurement or estimation of the load on a tire during the operation of a vehicle is often used by vehicle control systems such as braking, traction, stability, and suspension systems. For instance, information about individual tire loads enables precise estimation of the load distribution between the front and the rear axle of the vehicle, which can then be used to optimize the brake control system. Alternatively, knowledge of tire loads and consequently the vehicle mass may enable more accurate estimation of the remaining range of an electric vehicle. Thus, it is desirable to estimate the load on a tire in an accurate and reliable manner for input or use in such systems.

Prior art approaches have involved attempts at directly measuring tire load using load or strain sensors. Such direct-measurement techniques have experienced disadvantages due to the difficulty in achieving a sensor with a construction and placement on the tire that enables accurate and consistent measurement of tire load, particularly over the life of a tire.

Other prior art approaches have been developed that involve estimation of tire load using fixed parameters. Such prior art approaches have experienced disadvantages since techniques relying upon fixed parameters often lead to less-than-optimum predictions or estimations, which in turn reduces the accuracy and/or reliability of the tire load predictions.

As a result, there is a need in the art for a system and method that accurately and reliably estimates tire load.

SUMMARY OF THE INVENTION

According to an aspect of an exemplary embodiment of the invention, a load estimation system for a tire is provided. The tire includes a pair of sidewalls extending to a circumferential tread and supporting a vehicle. The system includes a sensor that is mounted to the tire, and an inflation pressure of the tire is measured by the sensor. A footprint is formed by the tread and includes a footprint length, which is measured by the sensor. A processor is in electronic communication with the sensor. A vehicle loading state estimator is in electronic communication with the processor and determines a loading state of the vehicle. An inflation correction factor is determined from the loading state of the vehicle, and a pressure correction module is in electronic communication with the processor. The pressure correction module receives the measured footprint length, the measured inflation pressure, and the inflation correction factor, and determines an adjusted footprint length. A de-noising module is in electronic communication with the processor and receives the adjusted footprint length to generate a filtered footprint length. A wear correction module is in electronic communication with the processor, receives the filtered footprint length, and corrects for wear of the tire to generate a wear-corrected footprint length. A load determination model is in electronic communication with the processor, receives the wear-corrected footprint length, and determines an estimated load on the tire.

According to another aspect of an exemplary embodiment of the invention, a method for estimating the load of a tire is provided. The tire includes a pair of sidewalls extending to a circumferential tread and supporting a vehicle. In the method, a sensor is mounted to the tire, and an inflation pressure of the tire is measured with the sensor. A length of a footprint formed by the tread is measured with the sensor, and a processor that is in electronic communication with the sensor is provided. A loading state of the vehicle is determined with a vehicle loading state estimator that is in electronic communication with the processor. An inflation correction factor is determined from the loading state of the vehicle. An adjusted footprint length is determined with a pressure correction module that is in electronic communication with the processor, in which the pressure correction module receives the measured footprint length, the measured inflation pressure, and the inflation correction factor. A filtered footprint length is generated with a de-noising module that is in electronic communication with the processor, in which the de-noising module receives the adjusted footprint length. A wear-corrected footprint length is generated with a wear correction module that is in electronic communication with the processor, in which the wear correction module receives the filtered footprint length. An estimated load on the tire is determined with a load determination model that is in electronic communication with the processor, in which the load determination model receives the wear-corrected footprint length.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" means lines or directions that are parallel to the axis of rotation of the tire.

"CAN bus" is an abbreviation for controller area network, which is a vehicle bus standard designed to allow microcontrollers and devices to communicate with each other within a vehicle without a host computer. CAN bus is a message-based protocol, designed specifically for vehicle applications.

"Circumferential" means lines or directions extending along the perimeter of the surface of the annular tread perpendicular to the axial direction.

"Equatorial Centerplane" means the plane perpendicular to the tire's axis of rotation and passing through the center of the tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Tread element" or "traction element" means a rib or a block element defined by a shape having adjacent grooves.

DETAILED DESCRIPTION OF THE INVENTION

Figure 1:
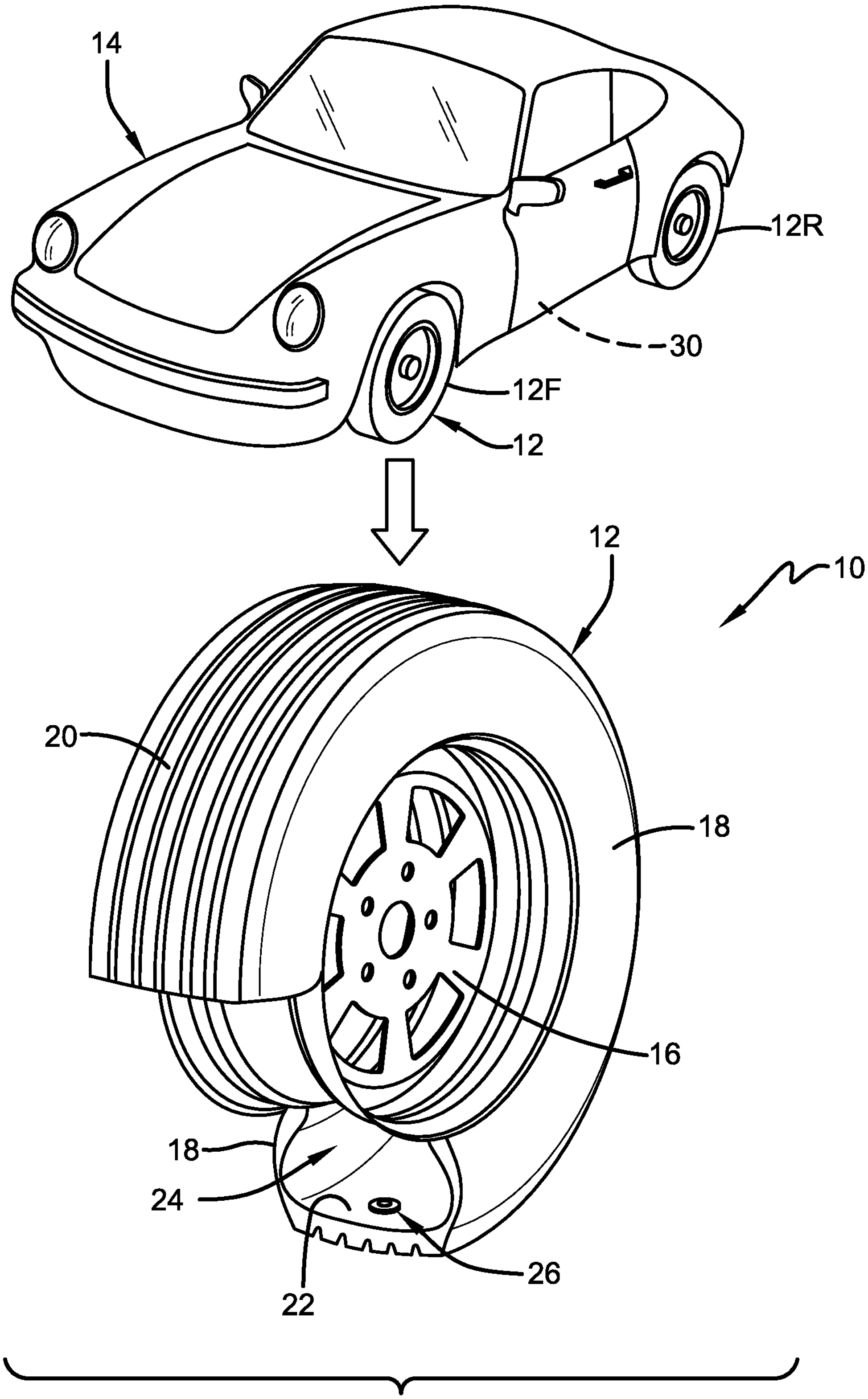
FIG. 1 is a perspective view of a vehicle and sensor-equipped tire employing the tire load estimation system and method of the present invention.

An exemplary embodiment of the tire load estimation system of the present invention is indicated at 10 in FIGS. 1 through 9. With particular reference to FIG. 1, the system 10 estimates the load on each tire 12 supporting a vehicle 14. While the vehicle 14 is depicted as a passenger car, the invention is not to be so restricted. The principles of the invention find application in other vehicle categories such as commercial trucks in which vehicles may be supported by more or fewer tires than shown in FIG. 1. For the purpose of convenience, analysis of a single tire 12 will be made except as specifically described below, with the understanding that a similar analysis is contemplated for each tire supporting the vehicle 14.

The tire 12 is of conventional construction and is mounted on a respective wheel 16. The tire 12 includes a pair of sidewalls 18 that extend to a circumferential tread 20, which engages the ground during vehicle operation. The tire 12 preferably is equipped with a sensor 26 that is mounted to the tire for the purpose of detecting certain real-time tire parameters. For example, the sensor 26 may be a commercially-available tire pressure monitoring system (TPMS) module or sensor, which may be affixed to an inner liner 22 of the tire 12 by suitable means such as adhesive. The sensor 26 preferably includes a pressure sensor to sense the inflation pressure within a cavity 24 of the tire 12, and a temperature sensor to sense the temperature of the tire and/or the temperature in the cavity.

The sensor 26 preferably also includes a processor and memory to store tire identification (tire ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12. The sensor 26 preferably further includes an antenna for transmitting measured parameters and tire ID data to a remote processor 28, which may be a processor that is integrated into a vehicle CAN bus 30, for analysis.

The tire load estimation system 10 and accompanying method attempts to overcome the above-described challenges posed by prior art systems and methods that seek to measure the tire load through direct sensor measurements. As such, the subject system and method is referred herein as an "indirect" load estimation system and method.

Figure 9:
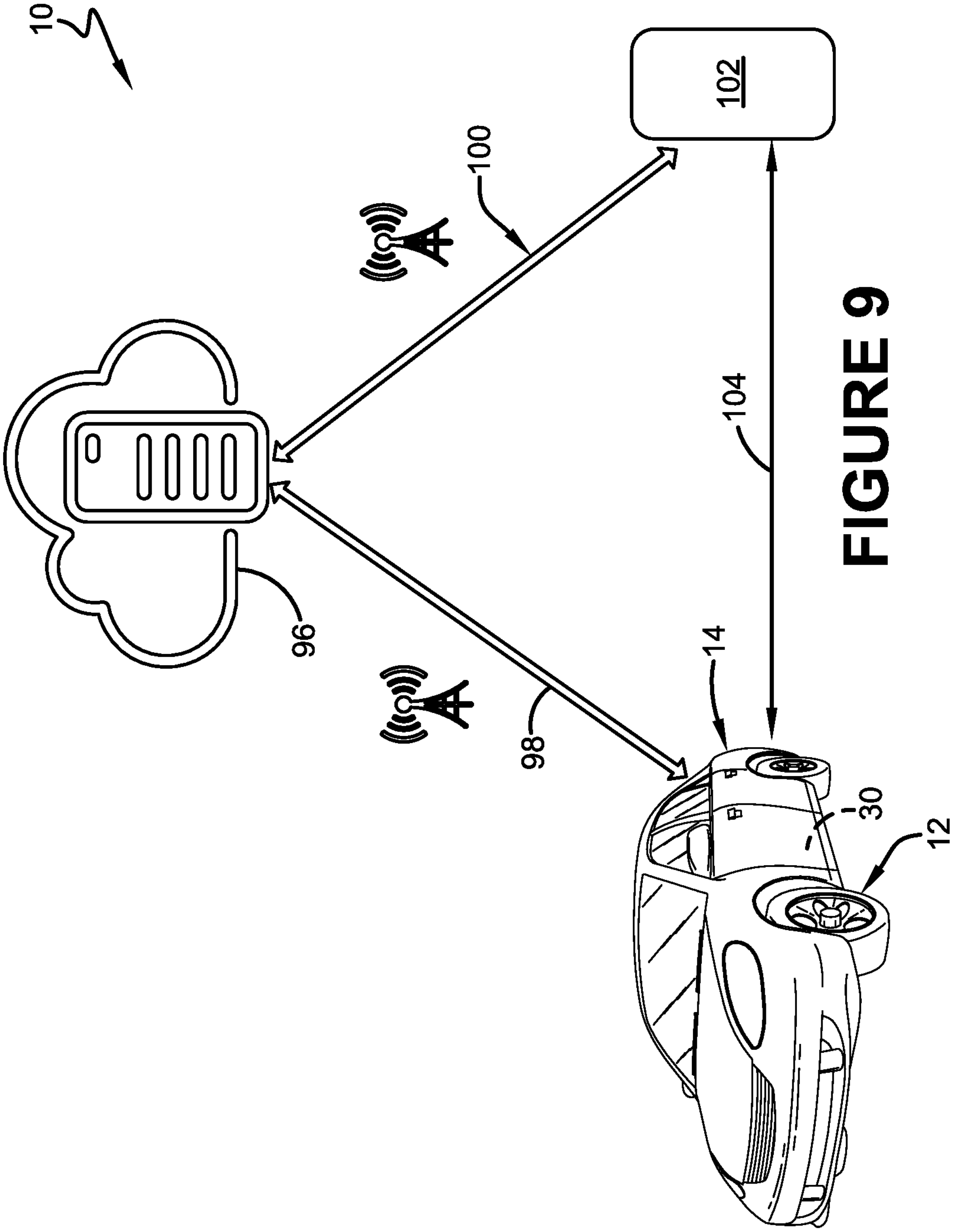
FIG. 9 is a schematic diagram of the vehicle shown in FIG. 1 with a representation of data transmission to a cloud-based server and to a user device.

Aspects of the tire load estimation system 10 preferably are executed on a processor 28 (FIG. 3) that is accessible through the vehicle CAN bus 30. The processor 28 may be a vehicle-mounted processor, or may be a remote Internet or cloud-based processor (FIG. 9). Use of such a processor 28, and accompanying memory, enables input of data into the system 10 from the tire-based sensor 26, data from certain vehicle-based sensors, and data from a lookup table or a database that is stored in a suitable storage medium and is in electronic communication with the processor. The CAN bus 30 enables the tire load estimation system 10 to interface with other electronic components and systems of the vehicle 14.

Figure 2:
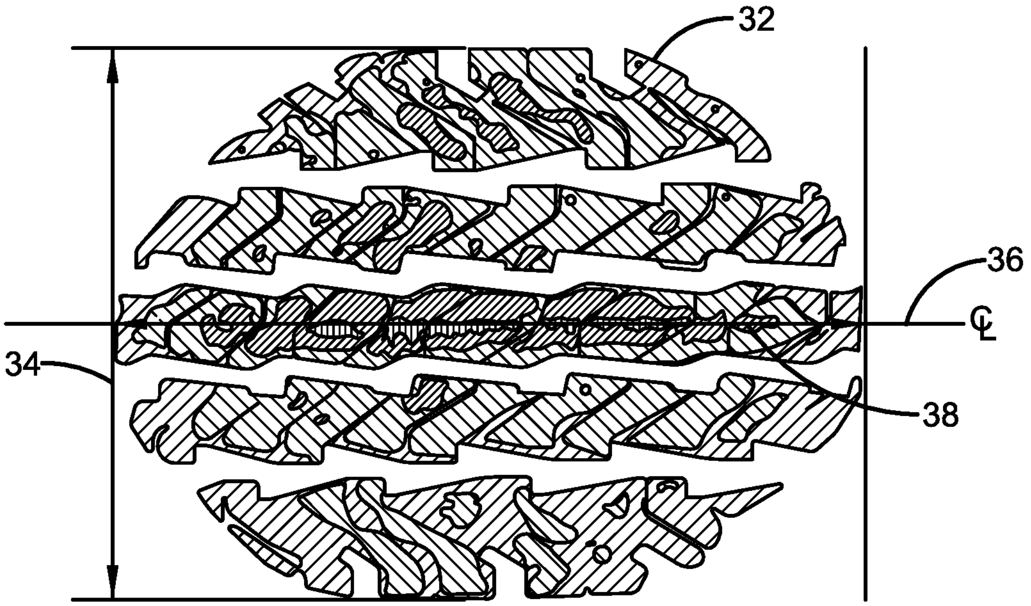
FIG. 2 is a plan view of the footprint of the tire shown in FIG. 1.

Turning now to FIG. 2, a footprint 32 of the tread 20 of the tire 12 (FIG. 1) is shown. The footprint 32 is the area that is created or formed as the tread 20 contacts the ground as the tire 12 rotates. The footprint 32 includes a width 34 that extends in a lateral direction across the tread 20. The footprint 32 also includes a centerline 36 that extends in a circumferential direction, that is, perpendicular to an axial or lateral direction. The centerline 36 is disposed at the middle of the width 34 of the footprint 32, and includes a length 38 that is referred to as the footprint centerline length or the footprint length.

The footprint length 38 may be sensed by the tire-mounted sensor 26 (FIG. 1) or by another suitable sensor. For example, the sensor 26 may include a strain sensor or piezoelectric sensor that measures deformation of the tread 20 and thus indicates the footprint length 38.

Figure 3:
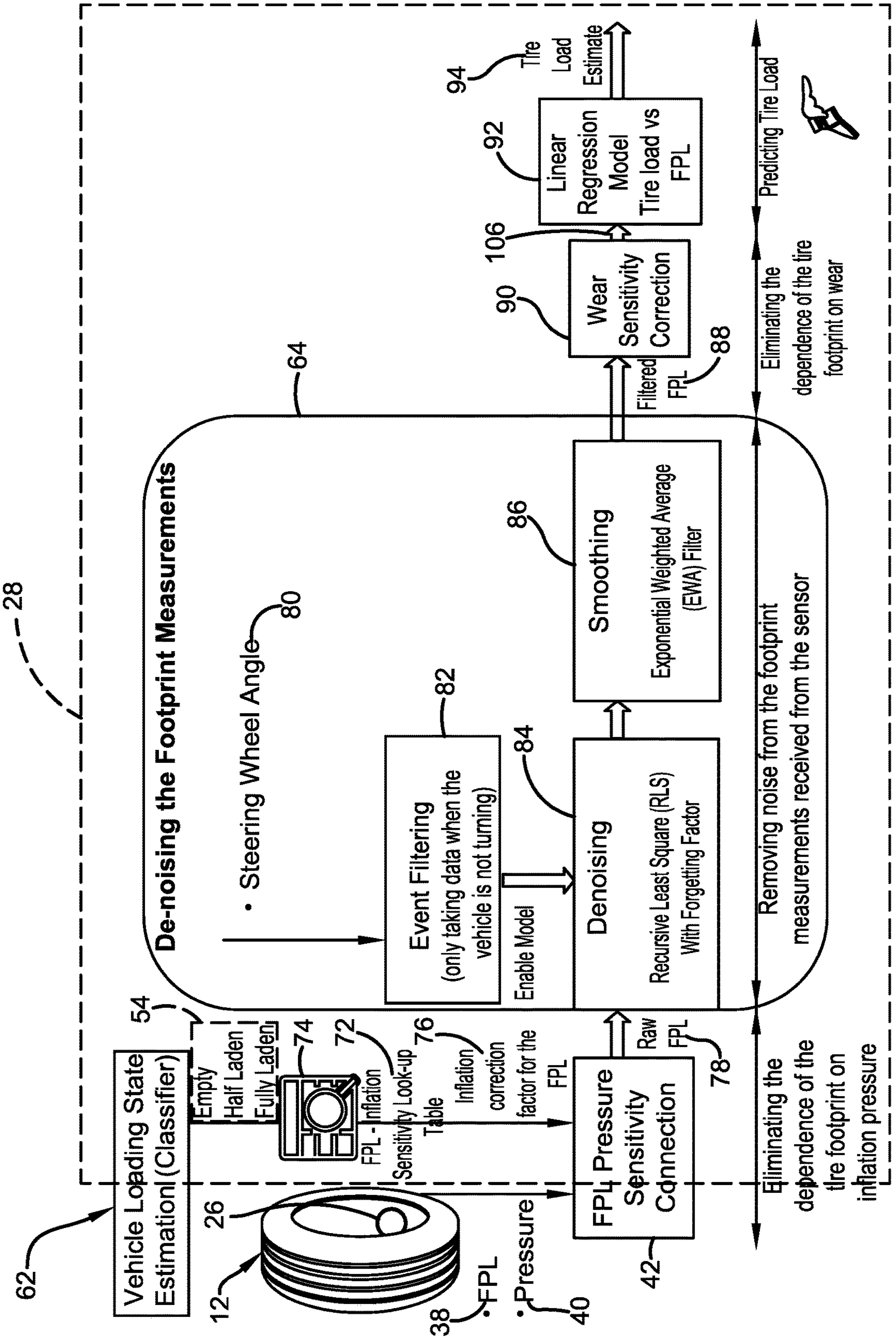
FIG. 3 is a schematic representation of an exemplary embodiment of a tire load estimation system of the present invention.

With reference to FIG. 3, the tire load estimation system 10 employs the measured footprint length 38 to estimate tire load. The system 10 provides a compensation or correction of the measured footprint length 38 to account for inflation pressure effects, while also compensating for a loading state by comparing a footprint length 38F of a front tire 12F to a footprint length 38R of a rear tire 12R. The system 10 also provides a compensation or correction of the footprint length 38 that accounts for wear of the tire 12.

The tire-mounted sensor 26 preferably wirelessly transmits the measured footprint length 38 and a measured inflation pressure 40 of the tire 12 to the processor 28. A pressure correction module 42 is stored on or is in electronic communication with the processor 28 and receives the measured footprint length 38 and the measured inflation pressure 40 for each tire 12. The pressure correction module 42 provides a compensation or correction of the measured footprint length 38 to account for inflation pressure effects.

Figure 4:
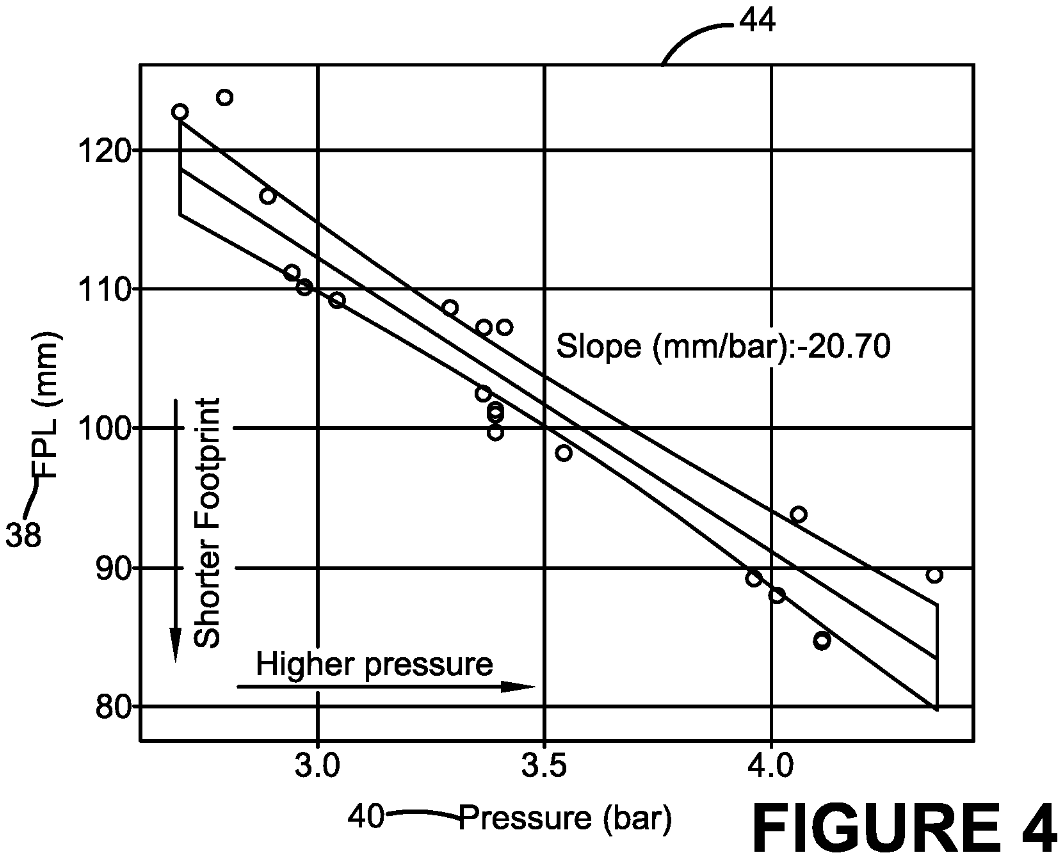
FIG. 4 is a graphical representation of tire footprint length versus inflation pressure.
Figure 5:
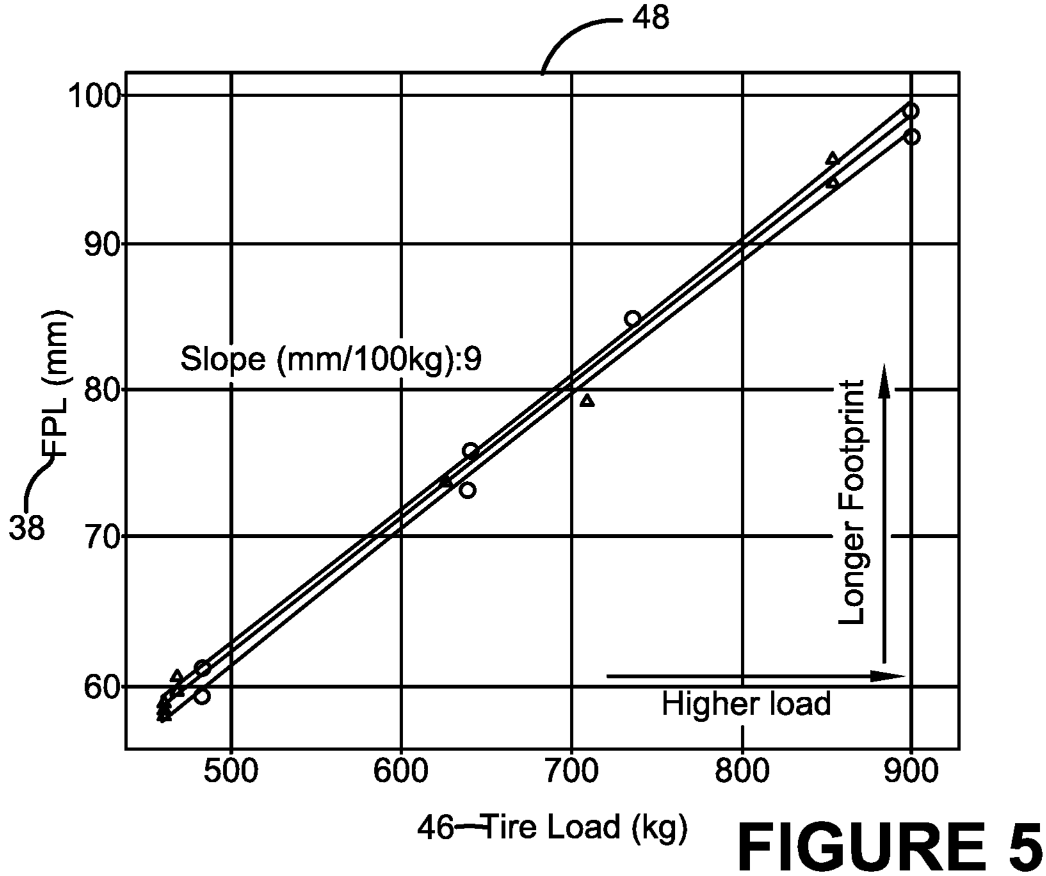
FIG. 5 is a graphical representation of tire footprint length versus tire load.

More particularly, with additional reference to FIG. 4, a plot 44 of the footprint length 38 versus the inflation pressure 40 of the tire 12 shows how the inflation pressure of the tire affects the footprint length. Specifically, a higher inflation pressure 40 corresponds to a shorter footprint length 38. In order to remove the effect of inflation pressure 40 on footprint length 38 and thus normalize the footprint length, the pressure correction module 42 receives the measured footprint length and the measured inflation pressure.

Returning to FIG. 3, the pressure correction module 42 also compensates for a loading state 46 of the tire 12. More particularly, to accurately adjust the measured footprint length 38 for changes in inflation pressure 40, the loading state 46 of the tire 12 needs to be accounted for. With additional reference to FIG. 5, a plot 48 of the footprint length 38 versus the loading state 46 for the tire 12 shows how the loading state of the tire affects the footprint length. Specifically, a higher loading state 46 corresponds to a longer footprint length 38.

It has been determined that, for a certain type of vehicle 14, such as a light commercial vehicle, the load on a front vehicle tire 12F (FIG. 7) does not significantly change when the vehicle is fully laden. In such a case, a footprint length 38F of the front tire 12F does not significantly change. In contrast, the load on a rear vehicle tire 12R significantly changes when the vehicle 14 is fully laden, and a footprint length 38R of the rear tire significantly changes. Based on this, the footprint length 38F of the front tire 12F may be used as a reference and compared to the footprint length 38R of the rear tire 12R to estimate the loading state of the vehicle 14, which may then be used to account for the loading state 46 of the tire 12.

Figure 6:
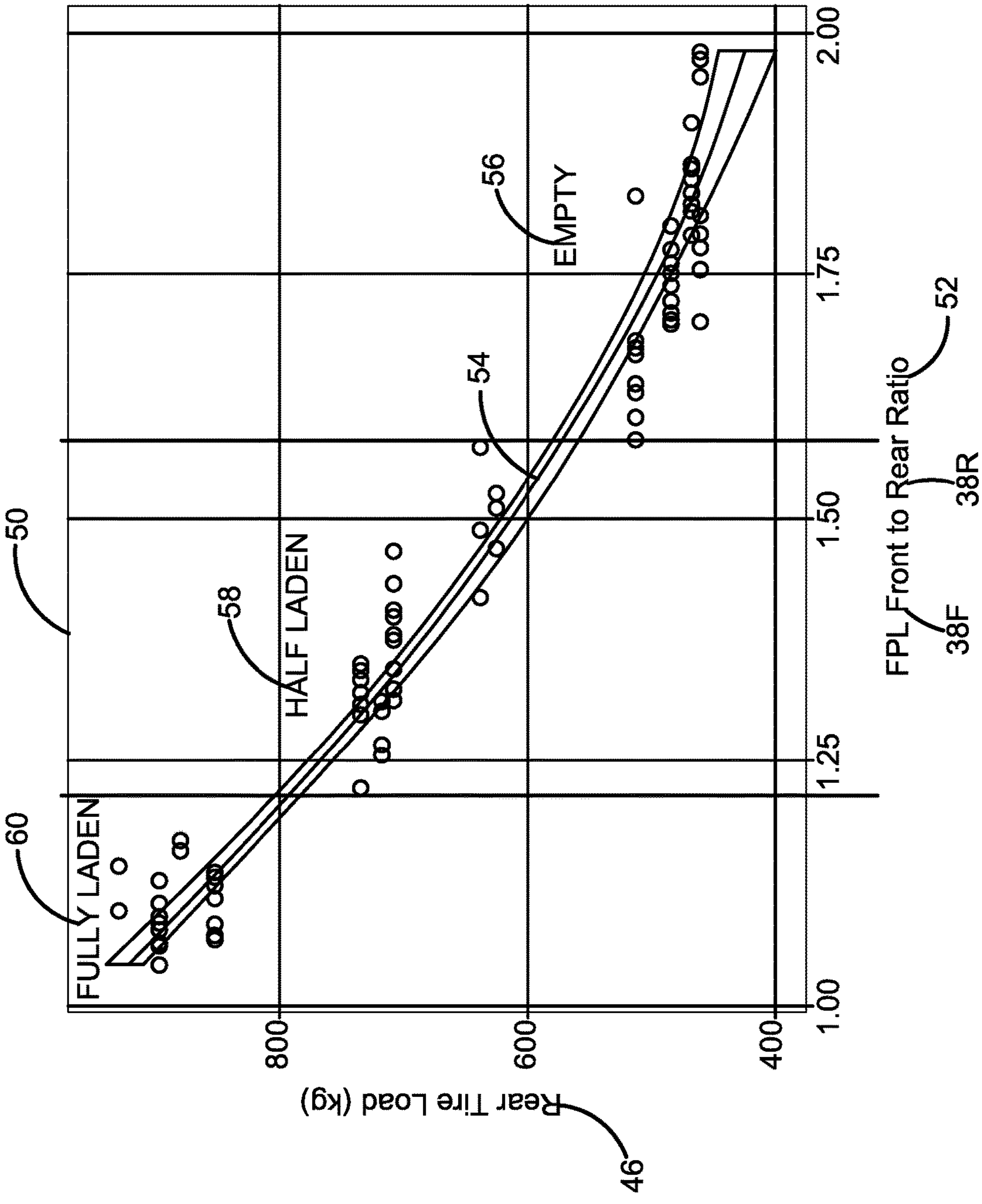
FIG. 6 is a graphical representation of tire load versus a ratio of a front tire footprint length to a rear tire footprint length.

As shown in FIG. 6, a plot 50 or comparison of the tire loading state 46 to a ratio 52 of the footprint length 38F of the front tire 12F to the footprint length 38R of the rear tire 12R under cruising conditions for the vehicle 14 shows that the vehicle loading state 54 may be determined. It is to be understood that a cruising condition is when the vehicle 14 is driven at a constant speed on a straight road. The vehicle loading state 54 may be categorized as empty 56, half laden 58, or fully laden 60.

Figure 7:
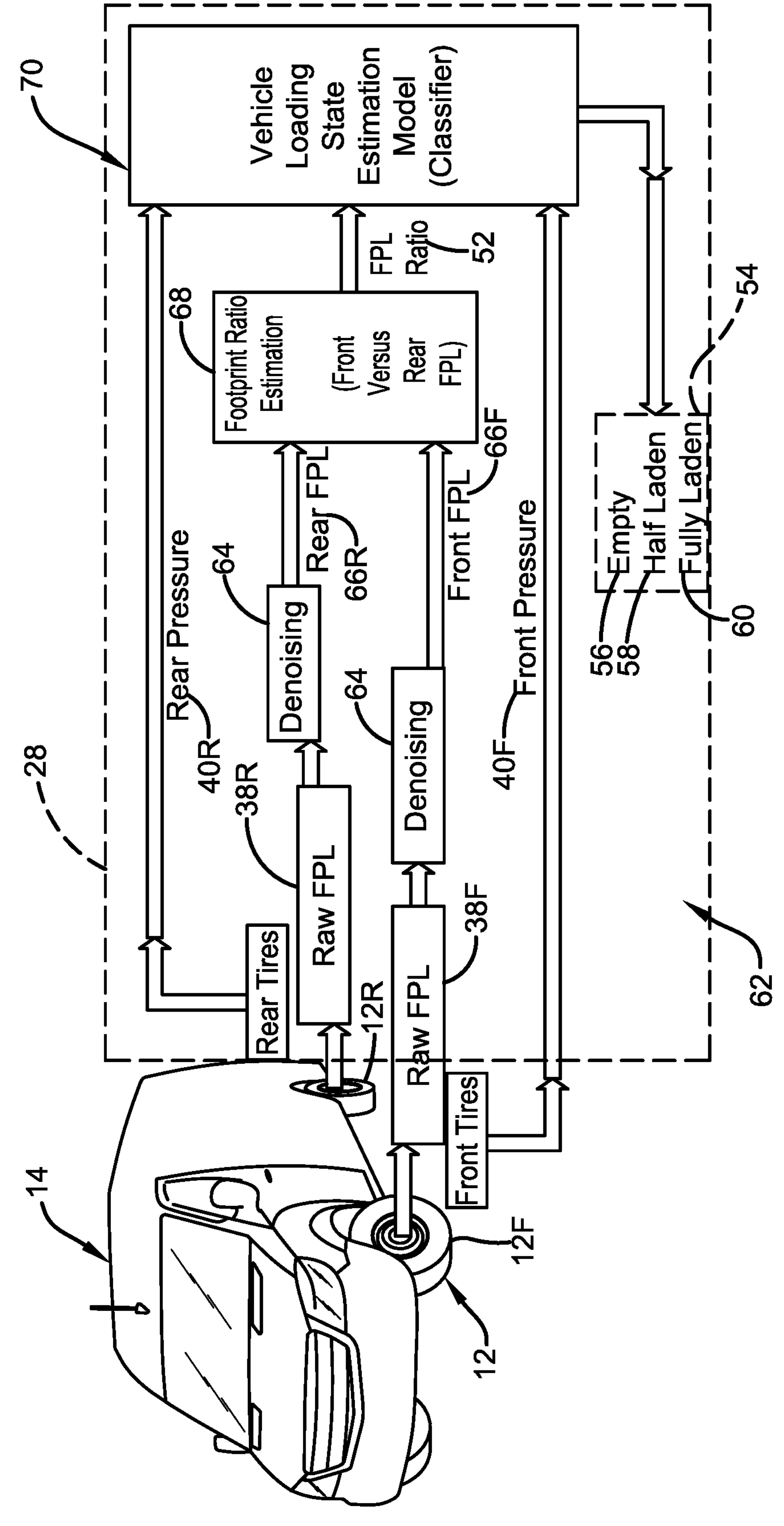
FIG. 7 is a schematic representation of a vehicle loading state estimation module of the exemplary embodiment of a tire load estimation system and method shown in FIG. 4.

Turning now to FIG. 7, the determination of the vehicle loading state 54 preferably is made by a vehicle loading state estimator 62. The tire-mounted sensor 26 preferably wirelessly transmits the measured footprint length 38F and an inflation pressure 40F of a front tire 12F, and the measured footprint length 38R and an inflation pressure 40R of a rear tire 12R, to the processor 28. The vehicle loading state estimator 62 is stored on or is in electronic communication with the processor 28 and receives the measured footprint lengths 38F and 38R and the inflation pressures 40F and 40R.

Each measured footprint length 38F and 38R is filtered to remove signal noise from the measured data with a de-noising module 64. An example of a de-noising module 64 is described in greater detail below. The de-noising module 64 outputs a filtered front footprint length 66F for the front tire 12F and a filtered footprint length 66R for the rear tire 12R. A ratio estimator 68 compares the filtered front footprint length 66F to the filtered rear footprint length 66R to determine the footprint length ratio 52.

Figure 8:
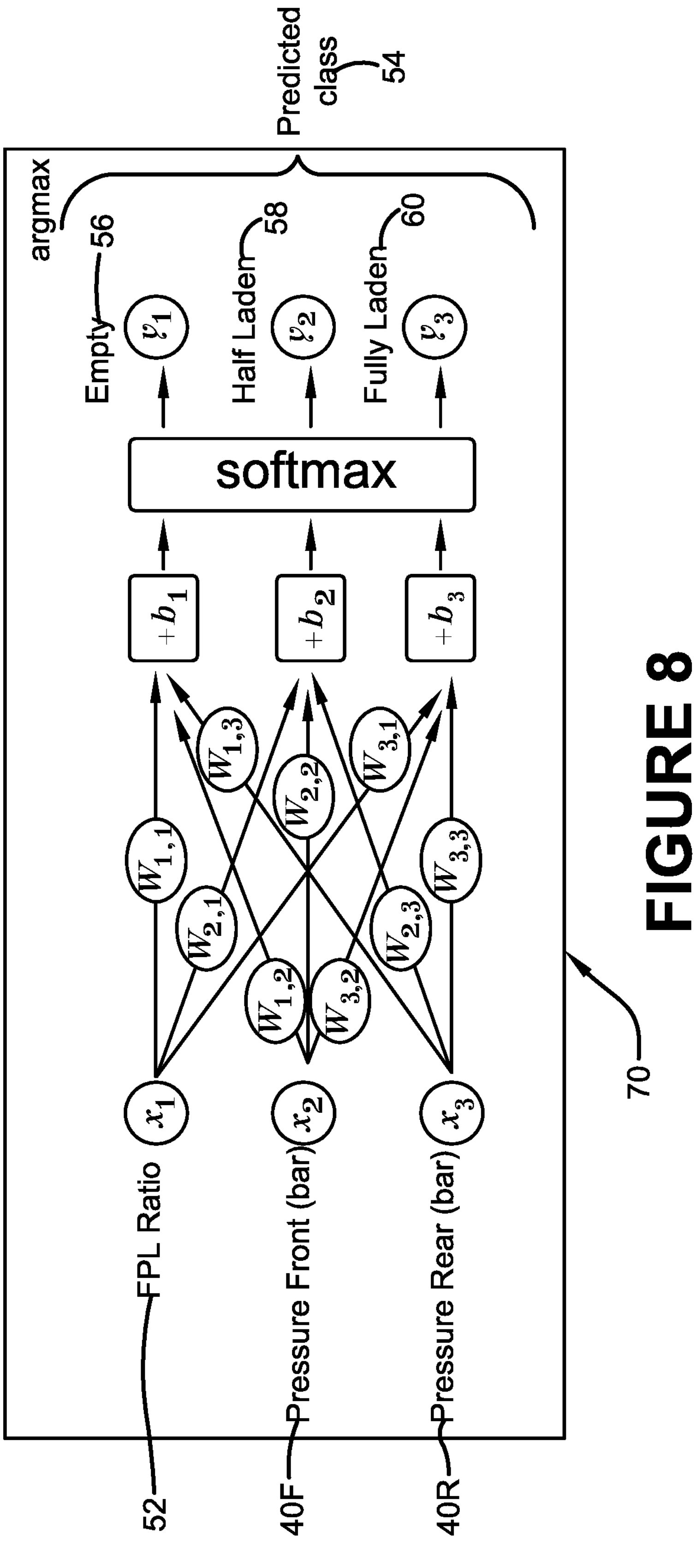
FIG. 8 is a schematic representation of a classification model that may be employed in the vehicle loading state estimation module shown in FIG. 7.

With additional reference to FIG. 8, the measured inflation pressure 40F for the front tire 12F, the measured inflation pressure 40R for the rear tire 12R, and the footprint length ratio 52 are input into a vehicle loading state estimation classification model 70 of the vehicle loading state estimator 62. The classification model 70 preferably identifies the vehicle loading state 54 from a multiclass classification of empty 56, half laden 58, or fully laden 60 using the front inflation pressure 40F, the rear inflation pressure 40R, and the footprint length ratio 52. Preferably, the classifier 72 employs a multinomial logistic regression classification methodology, such as a softmax regression, to identify the vehicle loading state 54. The multinomial logistic regression classification methodology is preferred based on its capability to predict the probabilities of different outcomes of a categorically distributed dependent variable when given a set of independent variables. The vehicle loading state estimation classification model 70 determines the specific loading state 54 of the vehicle 14, which is described by way of example as empty 56, half laden 58, or fully laden 60.

Returning to FIG. 3, once the vehicle loading state estimator 62 determines the loading state 54 of the vehicle 14, the loading state is correlated to an inflation sensitivity 72 for the tire 12. The inflation sensitivity may be stored in a lookup table or database 74 that is stored on or is in electronic communication with the processor 28. The inflation sensitivity 72 that corresponds to the specific loading state 54 enables a predetermined inflation correction factor 76 for the tire 12 to be determined.

The inflation correction factor 76 is input into the pressure correction module 42 along with the measured footprint length 38 and the measured inflation pressure 40 for the tire 12. The pressure correction module 42 adjusts the measured footprint length 38 according to the measured inflation pressure 40 and the inflation correction factor 76, thereby accounting for changes in inflation pressure and the loading state of the tire, to determine an adjusted footprint length 78. The pressure correction module 42 preferably includes a regression model, which may be a linear regression model or a nonlinear regression model, to determine the adjusted footprint length 78.

For example, the relationship between the measured footprint length 38 and the measured inflation pressure 40 may be accomplished with a linear regression model, which may be based on data from testing of the vehicle 14. Once the regression model coefficients have been determined, a slope coefficient may be employed to adjust the measured footprint length 38 using the following equation:

$$\text{Adjusted FPL} = \text{Measured FPL} - (\text{Measured } P - \text{Predetermined } P) * \text{SC}$$

where Adjusted FPL is the adjusted footprint length 78, Measured FPL is the measured footprint length 38, Measured P is the measured inflation pressure 40, Predetermined P is a predetermined target inflation pressure for the tire 12, and SC is the slope coefficient.

The adjusted footprint length 78 is filtered to remove signal noise from the measured data with a de-noising module 64, which is stored on or is in electronic communication with the processor 28. By way of example, the de-noising module 64 may receive a steering wheel angle 80 of the vehicle 14 as an input from the vehicle CAN bus system 30. The steering wheel angle 80 is input into an event filter 82, which screens the measured footprint length data 38 to ensure that only footprint length measurements during straight-line travel of the vehicle 14 are analyzed. In this manner, the event filter 82 ensures that consistent footprint length measurements 38 from straight-line travel are employed.

When the event filter 82 ensures that the vehicle 14 is traveling in a straight line, a de-noising algorithm 84 filters the adjusted footprint length data 78. A preferred de-noising algorithm 84 is an adaptive filter algorithm, such as a recursive least square algorithm with a forgetting factor, which gives less weight to older data samples to ensure that the most recent data receives a higher priority. After the de-noising algorithm 84, the adjusted footprint length data 78 is smoothed in a smoothing module 86 to capture significant patterns in the data. The smoothing module 86 employs a technique that is useful for time series data such as the adjusted footprint length data 78. A preferred technique in the smoothing module 86 is an exponential weighted average filter.

When the adjusted footprint length data 78 has been filtered by the de-noising module 64, a filtered footprint length 88 for the tire 12 is yielded. As the tire 12 wears, the measured footprint length 38 and the filtered footprint length 88 typically decrease. Thus, as the tire 12 wears, the shortened footprint length may create an inaccurate presumption that the tire load is changing. To account for such a presumption, the tire load estimation system 10 corrects for wear of the tire 12 with a wear correction model 90.

The wear correction module 90 receives the filtered footprint length 88 and is stored on or is in electronic communication with the processor 28. It has been determined that wear appears as a slow-moving drift in the filtered footprint length data 88. The wear correction module 90 removes the drift in the filtered footprint length data 88 to correct for wear of the tire 12. To remove the drift, the wear correction module 90 applies a direct current (DC) block filter to the filtered footprint length data 88. The DC block filter separates the signal for the filtered footprint length data 88 into two components. The first component is a DC component, which carries a load dependency, and the second component is a drift component, which carries a wear dependency. The wear correction module 90 identifies and removes the drift component from the filtered footprint length data 88 to generate a wear-corrected footprint length 106.

The wear-corrected footprint length 106 is input into a load determination model 92, which is stored on or is in electronic communication with the processor 28. The load determination model 92 preferably employs a regression model to calculate the load on the tire 12 that corresponds to the wear-corrected footprint length 106. The regression model may be a linear regression model, or a nonlinear regression model. The load determination model 92 thus determines and outputs an estimated load 94 on the tire 12. The estimated load 94 may be communicated through the vehicle CAN bus system 30 from the tire load estimation system 10 for use by a vehicle control system, such as a braking, traction, stability, and/or suspension system.

Turning to FIG. 9, the tire load estimation system 10 preferably is executed on a processor 28 that is accessible through the vehicle CAN bus 30, which may be mounted on the vehicle 14, or which may be in an Internet or cloud-based computing system 96, referred to herein as a cloud-based computing system. The tire load estimation system 10 preferably employs wireless data transmission 98 between the vehicle 14 and the cloud-based computing system 96. The tire load estimation system 10 may also employ wireless data transmission 100 between the cloud-based computing system 96 and a display device 102 that is accessible to a user of the vehicle 14, such as a smartphone, or to a fleet manager. Alternatively, the system 10 may also employ wireless data transmission 104 between the vehicle CAN bus 30 and the display device 102.

In this manner, the tire load estimation system 10 of the present invention indirectly estimates tire load in an accurate and reliable manner using the measured footprint length 38 of the tire 12. The tire load estimation system 10 provides compensation of the measured footprint length 38 to account for inflation pressure effects, and also compensates for a loading state by comparing a footprint length 38F of a front tire 12F to a footprint length 38R of a rear tire 12R. The system 10 also provides a compensation or correction of the footprint length 38 that accounts for wear of the tire 12.

The present invention also includes a method for estimating the load of a tire 12. The method includes steps in accordance with the description that is presented above and shown in FIGS. 1 through 9.

It is to be understood that the structure and method of the above-described tire load estimation system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A load estimation system for a tire, the tire including a pair of sidewalls extending to a circumferential tread and supporting a vehicle, the system comprising:

a sensor being mounted to the tire, wherein the tire is a front tire;

an inflation pressure of the tire being measured by the sensor;

a footprint formed by the tread, the footprint including a footprint length, wherein the footprint length is measured by the sensor;

a processor in electronic communication with the sensor;

a vehicle loading state estimator in electronic communication with the processor and determining a loading state of the vehicle, wherein the vehicle loading state estimator employs the measured inflation pressure and a ratio of the measured footprint length of the front tire to a second footprint length, wherein the second footprint length is a footprint length of a rear tire, and the loading state of the vehicle distinguishes between an empty, half laden, and fully laden vehicle state;

an inflation correction factor for at least one of the front tire and the rear tire being determined from the loading state of the vehicle;

a pressure correction module in electronic communication with the processor, the pressure correction module receiving the measured footprint length, the measured inflation pressure, and the inflation correction factor, wherein the pressure correction module determines an adjusted footprint length;

a de-noising module in electronic communication with the processor, the de-noising module receiving the adjusted footprint length to generate a filtered footprint length;

a wear correction module in electronic communication with the processor, the wear correction module receiving the filtered footprint length and correcting for wear of at least one of the front tire and the rear tire to generate a wear-corrected footprint length;

a load determination model in electronic communication with the processor, the load determination model receiving the wear-corrected footprint length and determining an estimated load on at least one of front tire and the rear tire; and a vehicle control system in electronic communication with the processor, the vehicle control system receiving the estimated load on at least one of the front tire and the rear tire.

2. The load estimation system for a tire of claim 1, wherein the sensor is a front sensor being mounted in the front tire, the inflation pressure is a front inflation pressure, and the measured footprint length is a front footprint length, the system further comprising:

a rear sensor being mounted to the rear tire;

a rear inflation pressure of the rear tire being measured by the rear sensor; and wherein the rear footprint length is measured by the rear sensor, wherein the vehicle loading state estimator receives the front and rear measured footprint lengths and the front and rear inflation pressures.

3. The load estimation system for a tire of claim 2, wherein the vehicle loading state estimator includes a de-noising module receiving the front measured footprint length and the rear measured footprint length, the de-noising module removing signal noise to generate a filtered front footprint length and a filtered rear footprint length.

4. The load estimation system for a tire of claim 3, wherein the vehicle loading state estimator includes a ratio estimator that compares the filtered front footprint length to the filtered rear footprint length to determine the ratio.

5. The load estimation system for a tire of claim 4, wherein the vehicle loading state estimator includes a vehicle loading state estimation classification model, the vehicle loading state estimation classification model receiving the front inflation pressure, the rear inflation pressure, and the ratio to determine the loading state of the vehicle.

6. The load estimation system for a tire of claim 5, wherein the vehicle loading state estimation classification model employs a multinomial logistic regression classification methodology.

7. The load estimation system for a tire of claim 1, further comprising:

at least one of a lookup table and a database in electronic communication with the processor; and an inflation sensitivity being stored in the at least one of the lookup table and the database, the inflation sensitivity being correlated to the vehicle loading state classification, wherein the inflation correction factor is determined from the inflation sensitivity.

8. The load estimation system for a tire of claim 1, wherein the de-noising module includes an event filter, the event filter receiving a steering wheel angle of the vehicle from a controlled area network bus of the vehicle to ensure that only footprint length measurements during straight-line travel of the vehicle are analyzed.

9. The load estimation system for a tire of claim 8, wherein the de-noising module includes a de-noising algorithm to filter the adjusted footprint length data.

10. The load estimation system for a tire of claim 9, wherein the de-noising algorithm includes a recursive least square algorithm with a forgetting factor.

11. The load estimation system for a tire of claim 9, wherein the de-noising module includes a smoothing module, the smoothing module receiving the adjusted footprint length from the de-noising algorithm to generate the filtered footprint length.

12. The load estimation system for a tire of claim 11, wherein the smoothing module employs an exponential weighted average filter.

13. The load estimation system for a tire of claim 1, wherein the wear correction module includes a direct current block filter, the direct current block filter separating a signal for the filtered footprint length into a direct current component that carries a load dependency and a drift component that carries a wear dependency.

14. The load estimation system for a tire of claim 13, wherein the wear correction module removes the drift component from the filtered footprint length to generate the wear-corrected footprint length.

15. The load estimation system for a tire of claim 1, wherein the wear determination model employs a regression model.

16. The load estimation system for a tire of claim 15, wherein the regression model includes a linear regression model.

17. The load estimation system for a tire of claim 1, wherein the processor includes at least one of a vehicle-mounted processor and a processor in a cloud-based computing system.

18. A method for estimating the load of a tire, the tire including a pair of sidewalls extending to a circumferential tread and supporting a vehicle, the method comprising the steps of:

mounting a sensor to the tire, wherein the tire is a front tire;

measuring an inflation pressure of the tire with the sensor;

measuring with the sensor a length of a footprint formed by the tread;

providing a processor in electronic communication with the sensor;

determining a loading state of the vehicle with a vehicle loading state estimator that is in electronic communication with the processor, wherein the vehicle loading state estimator employs the measured inflation pressure and a ratio of the measured footprint length of the front tire to a second footprint length, wherein the second footprint length is a footprint length of a rear tire, and the loading state of the vehicle distinguishes between an empty, half laden, and fully laden vehicle state;

determining an inflation correction factor for at least one of the front tire and the rear tire from the loading state of the vehicle;

determining an adjusted footprint length with a pressure correction module that is in electronic communication with the processor, the pressure correction module receiving the measured footprint length, the measured inflation pressure, and the inflation correction factor;

generating a filtered footprint length with a de-noising module that is in electronic communication with the processor, the de-noising module receiving the adjusted footprint length;

generating a wear-corrected footprint length with a wear correction module that is in electronic communication with the processor, the wear correction module receiving the filtered footprint length;

determining an estimated load on at least one of the front tire and the rear tire with a load determination model that is in electronic communication with the processor, the load determination model receiving the wear-corrected footprint length; and communicating the estimated load on at least one of the front tire and the rear tire to a vehicle control system in electronic communication with the processor.

* * * * *